US009360673B2

(12) United States Patent
Loubiere et al.

(10) Patent No.: US 9,360,673 B2
(45) Date of Patent: Jun. 7, 2016

(54) INTERACTION METHOD IN AN AIRCRAFT COCKPIT BETWEEN A PILOT AND HIS ENVIRONMENT

(71) Applicant: Airbus (SAS), Blagnac (FR)

(72) Inventors: Vincent Loubiere, Toulouse (FR); Alexandre Godin, Brax (FR)

(73) Assignee: AIRBUS SAS, Blagnac (FR)

( * ) Notice: Subject to any disclaimer, the term of this patent is extended or adjusted under 35 U.S.C. 154(b) by 123 days.

(21) Appl. No.: 14/261,858

(22) Filed: Apr. 25, 2014

(65) Prior Publication Data

US 2014/0320321 A1 Oct. 30, 2014

(30) Foreign Application Priority Data

Apr. 26, 2013 (FR) ..................................... 13 53808

(51) Int. Cl.
| | |
|---|---|
| *G01C 21/00* | (2006.01) |
| *G02B 27/01* | (2006.01) |
| *G06F 3/0488* | (2013.01) |
| *G06F 3/01* | (2006.01) |
| *G01C 19/72* | (2006.01) |

(52) U.S. Cl.
CPC .......... *G02B 27/0179* (2013.01); *G01C 19/721* (2013.01); *G06F 3/013* (2013.01); *G06F 3/0488* (2013.01); *G02B 2027/0187* (2013.01); *G09G 2354/00* (2013.01); *G09G 2380/12* (2013.01)

(58) Field of Classification Search
None
See application file for complete search history.

(56) References Cited

U.S. PATENT DOCUMENTS

| | | | | |
|---|---|---|---|---|
| 6,526,159 | B1 * | 2/2003 | Nickerson | ............... G06F 3/013 345/156 |
| 2008/0231634 | A1 * | 9/2008 | Gyde | ..................... G01C 23/00 345/427 |
| 2011/0109574 | A1 | 5/2011 | Cipriano et al. | |
| 2012/0120247 | A1 | 5/2012 | Kao et al. | |
| 2012/0327034 | A1 | 12/2012 | Dominici et al. | |

FOREIGN PATENT DOCUMENTS

| | | |
|---|---|---|
| EP | 1484665 | 12/2004 |
| EP | 2530564 | 12/2012 |

OTHER PUBLICATIONS

French Search Report, Jan. 31, 2014.

\* cited by examiner

*Primary Examiner* — Travis Hunnings
(74) *Attorney, Agent, or Firm* — Greer, Burns & Crain, Ltd.

(57) ABSTRACT

An interaction method in an aircraft cockpit between a pilot and his environment. The cockpit includes a plurality of activation zones which each comprise an element of interest which is connected with the cockpit or the external environment thereof and which can be activated on the basis of the interaction of at least one movable member of the pilot's body with the activation zone. The method includes the steps of establishing, in a manner repeated over time, the spatial position of the movable member of the pilot's body and a comparison between such spatial position and the position of the activation zones and automatic activation of the activation zone in the environment of the pilot in order to inform the pilot about the availability of further interaction with the element of interest involved. The method improves the interaction between the pilot and his environment connected with the cockpit.

17 Claims, 6 Drawing Sheets

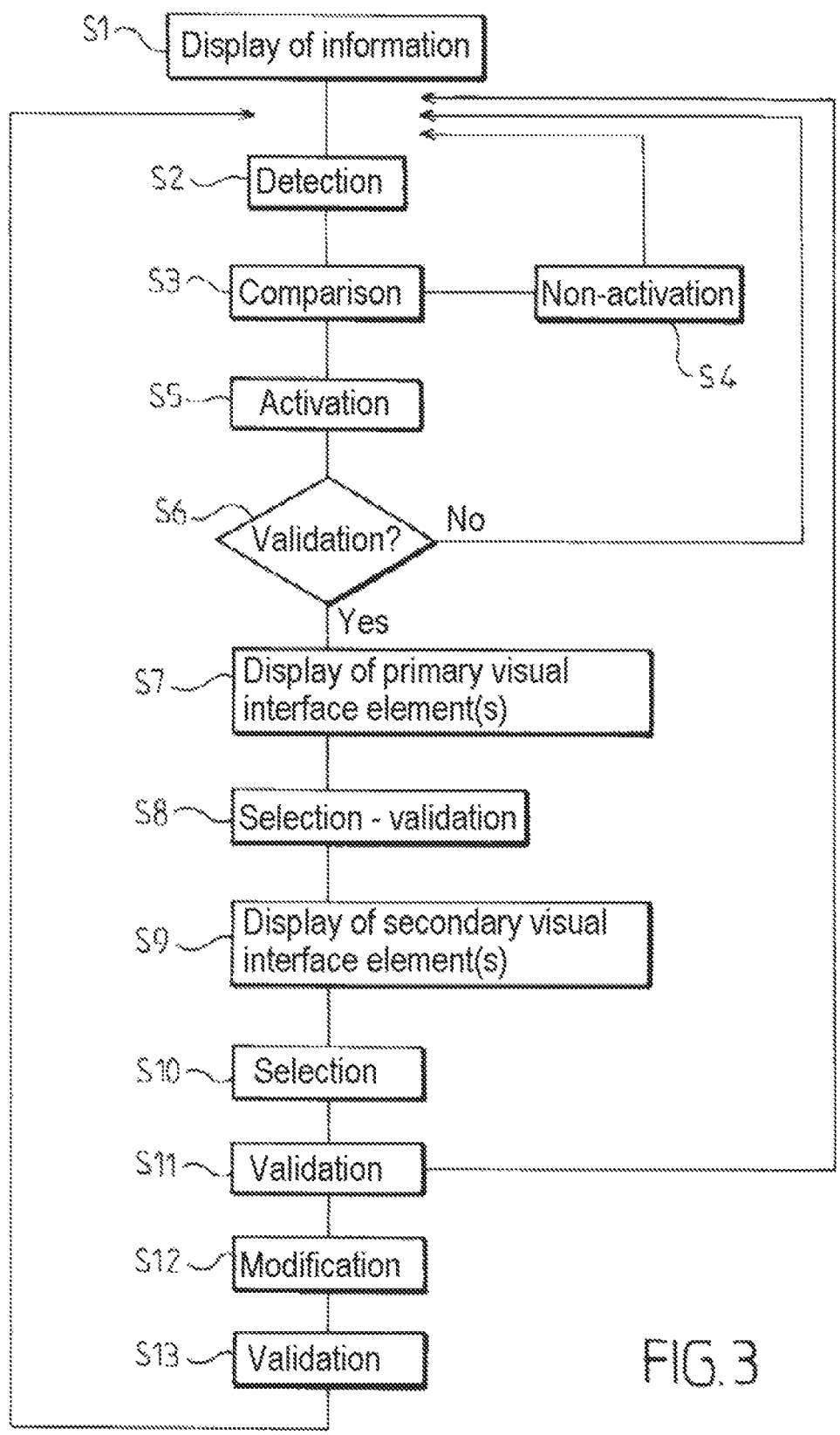

INTERACTION METHOD IN AN AIRCRAFT COCKPIT BETWEEN A PILOT AND HIS ENVIRONMENT

CROSS-REFERENCES TO RELATED APPLICATIONS

This application claims the benefit of French patent application No. 1353808 filed on Apr. 26, 2013, the entire disclosures of which are incorporated herein by way of reference.

BACKGROUND OF THE INVENTION

The invention relates to an interaction method in an aircraft cockpit between a pilot and his environment.

Nowadays, aircraft cockpits are provided with screens which are arranged on consoles which are, for example, arranged under the windscreen and also screens or "head up displays" (HUDs). The HUDs allow complementary information to be superimposed on reality by means of a collimated projection system on a transparent pane arranged in front of the pilot.

The first HUDs were configured as intuitive tools, that is to say, in order to display pieces of information which require little cognitive processing. The development of those displays has allowed them to include more and more information but to the detriment of the intuitive nature of the tool.

Furthermore, the actuators which are present in cockpits are generally produced in the form of physical buttons (for example, keys of a keyboard) which are mechanical or digital. The multiplication of buttons of all types tends to make the interface with the system complex, and therefore the pilot/environment interface. The command surfaces also tend to be more and more extensive, which makes the arrangement of the equipment in the cockpit and the ergonomics thereof complex. Furthermore, the use of complex systems often requires a long training period.

In light of the above, it would be advantageous to be able to improve the interaction in an aircraft cockpit between a pilot and his environment, in particular the environment connected with the cockpit.

SUMMARY OF THE INVENTION

Thus, the invention relates to an interaction method in an aircraft cockpit between a pilot and his environment, characterized in that the cockpit comprises at least one activation zone which comprises an element of interest which is connected with the cockpit or the external environment thereof and which can be activated on the basis of the interaction of at least one movable member (eye, hand, etcetera) of the body of the pilot with the at least one activation zone, the method comprising the following steps:

establishing in a manner repeated over time the spatial position of at least one movable member (eye, hand, etcetera) of the body of the pilot, comparison between the established spatial position and the spatial position of the at least one activation zone in order to establish whether there is interaction between the at least one movable member of the pilot and the at least one activation zone, in accordance with the result of the comparison, decision involving activation or non-activation of the element of interest of the at least one activation zone in order to inform the pilot about the availability of further interaction with the element of interest.

This method allows the pilot to be assisted in his interaction with his environment in that the movements of at least one movable member (eye, hand, et cetera) of the body of the pilot are analyzed over time in order to detect first intentions of the pilot without the pilot having really carried out a precise action. In this manner, it is simply necessary, for example, for the visual focus of the pilot to have been positioned on a screen and/or for the pilot to have suggested a gesture in the direction of the screen so that the position of the visual focus and/or of the hand is established and the interaction system (on which the method is based for its implementation) understands or interprets the intentions of the pilot and activates the zone viewed or approached by the hand. In particular, the comparison between the established position and the (known) position of an activation zone comprising an element of interest allows the intention, or in any case the interest, of the pilot to be interpreted for this element of interest and thus allows the element of interest to be activated in order to inform the pilot about the possibilities of interaction therewith.

Such a method thereby considerably improves the interaction between the pilot and his environment.

According to other possible features taken alone or together with each other:

- the at least one movable member of the pilot is an eye and/or a hand;
- in the event of a decision involving activation of the element of interest of the at least one activation zone, the method comprises the following steps:
- validation by the pilot of the activated element of interest,
- display of one or more visual interface elements affording access to information and/or possible actions relating to the activated element of interest;
- the above-mentioned display step is a first display step of one or more visual interface elements, referred to as primary elements, the method comprising a second display step for a plurality of visual interface elements, referred to as secondary elements, which afford access to information and/or possible actions relating to the activated element of interest;
- the method comprises a step of selection of one of the primary and/or secondary visual interface elements by the pilot;
- the display of a visual interface element(s) is carried out at a maximum distance from the activated element of interest which corresponds to the size of the activated element of interest;
- the method comprises a step of comparing the activated element of interest with a plurality of reference elements of interest, for each of which pieces of information are available and/or actions are possible;
- the selection by the pilot of at least one visual interface element affords access to the modification of at least one information element relating to the activated element of interest;
- the method comprises a step of modification of the at least one information element by the pilot;
- the modification of the at least one information element is possible as long as the at least one movable member of the body of the pilot interacts with the activated element of interest;
- the method comprises a step of validation of the effected modification of the at least one information element by the pilot;
- the validation of the modification is possible as long as the at least one movable member of the body of the pilot interacts with the activated element of interest;

before the interaction of the at least one movable member (eye, hand, etcetera) of the body of the pilot with the at least one activation zone, the method comprises a step of displaying information indicating to the pilot the element(s) of interest connected with the cockpit or his environment with which further interaction is possible;

the pieces of information are displayed at a maximum distance from the or each activated element of interest which corresponds to the size of the activated element of interest;

the at least one activation zone which comprises an element of interest connected with the cockpit or its environment is at least one of the following zones:

one of the screens of the cockpit,
a portion of a screen of the cockpit,
at least one portion of the windscreen of the cockpit,
a transparent screen interposed in front of the windscreen of the cockpit inside the cockpit;

the element of interest connected with the cockpit or its environment is at least one of the following elements of interest:

one of the screens of the cockpit,
a portion of a screen of the cockpit,
an editable scale on a screen of the cockpit,
the representation of another aircraft,
the representation of an airport or an object which is external with respect to the cockpit and which may or may not be visible through the windscreen of the cockpit;

the validation and/or selection by the pilot is/are particularly in one of the following forms:

a gesture on a tactile surface or in space,
pressure on a key of a keyboard or on a pedal,
activation of a mouse or pointing device,
the emission of sounds,
the time for which the visual focus of the pilot is fixed on the at least one activation zone,
the time of the presence of a hand of a pilot in the at least one activation zone.

The invention also relates to an interaction system in an aircraft cockpit between a pilot and his environment, characterized in that the interaction system comprises:

one or more units for establishing the spatial position of at least one movable member (eye, hand, etcetera) of the body of the pilot, at least one activation zone which comprises an element of interest connected with the cockpit or its external environment and which can be activated on the basis of the interaction of the at least one movable member of the body of the pilot with the at least one activation zone, a data processing unit which is capable of comparing the spatial position established and the spatial position of the at least one activation zone of the cockpit in order to establish whether there is any interaction between the at least one movable member of the pilot and the at least one activation zone, the data processing unit also being capable of deciding to activate or not to activate the element of interest of the at least one activation zone in order to inform the pilot about the availability of further interaction with the element of interest.

According to a possible feature, the establishment unit(s) comprise(s) one or more eye tracker(s) and/or one or more establishment unit(s) which is/are intended to establish the position of a hand of a pilot.

According to another possible feature, the unit(s) for establishing the position of the hand of a pilot comprise(s) at least one of the following element(s):

at least one tactile surface,
one or more sensors.

According to another possible feature, the interaction system comprises a detection device which is configured to detect in particular a selection and/or validation and/or confirmation action on the part of the pilot.

The detection device may comprise at least one of the following means:

means for validation of the activated element of interest by the pilot,
means for selection of at least one visual interface element by the pilot.

According to a possible feature, the means for validation of the activated element of interest by the pilot and/or the means for selection of at least one visual interface element by the pilot comprise at least one tactile surface.

According to other possible features taken alone or when combined with each other:

the system comprises at least one display surface, on which the at least one activation zone which comprises an element of interest connected with the cockpit or its environment is displayed;

the system comprises means for displaying one or more visual interface element(s) which afford(s) access to information and/or possible actions relating to the activated element of interest;

the at least one activation zone which comprises an element of interest connected with the cockpit or its environment is at least one of the following zones:

one of the screens of the cockpit,
a portion of a screen of the cockpit,
at least one portion of the windscreen of the cockpit,
a transparent screen interposed in front of the windscreen of the cockpit inside the cockpit;

the element of interest connected with the cockpit or its environment is at least one of the following elements of interest:

one of the screens of the cockpit,
a portion of a screen of the cockpit,
an editable scale on a screen of the cockpit,
the representation of another aircraft,
the representation of an airport or an object which is external with respect to the cockpit and which may or may not be visible through the windscreen of the cockpit.

The invention also relates to an aircraft cockpit, characterized in that it comprises an interaction system in an aircraft cockpit between a pilot and his environment as briefly mentioned above.

BRIEF DESCRIPTION OF THE DRAWINGS

Other features and advantages will be appreciated from the following description which is given purely by way of non-limiting example and with reference to the appended drawings, in which:

FIG. 3 is a general view illustrating the different steps of an interaction method in an aircraft cockpit between a pilot and his environment according to an embodiment of the invention;

DETAILED DESCRIPTION OF THE PREFERRED EMBODIMENTS

Figure 1:
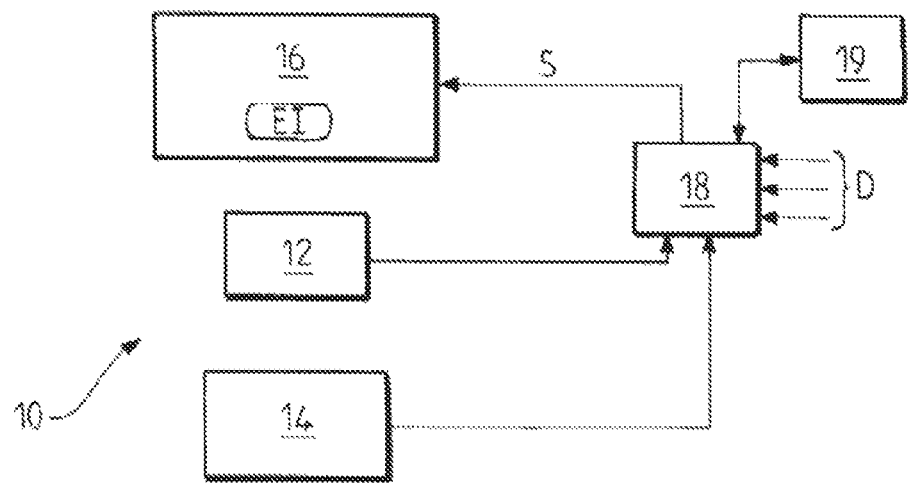
FIG. 1 is a schematic view of an interaction system in an aircraft cockpit between a pilot and his environment in accordance with an embodiment of the invention.
Figure 2:
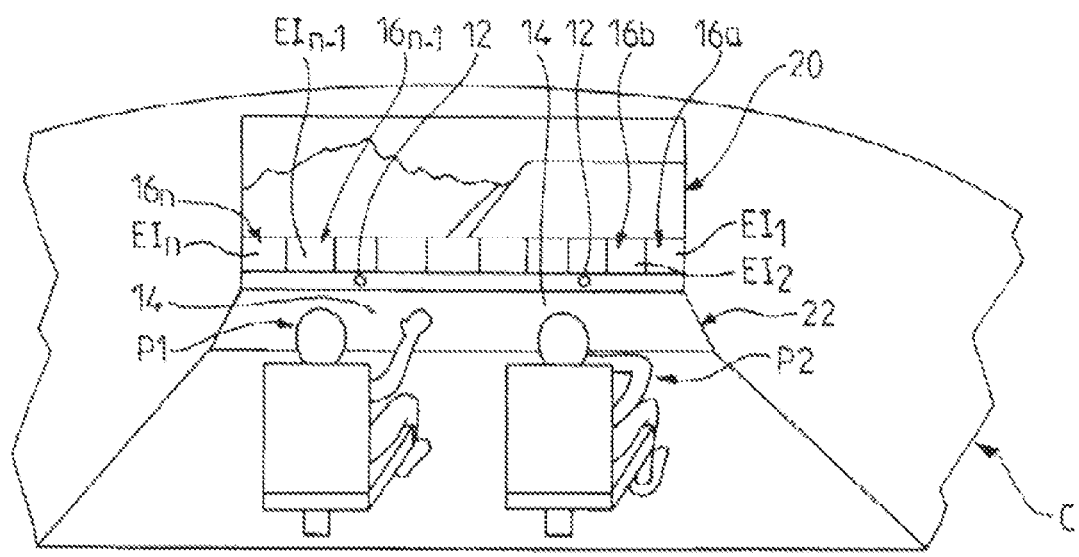
FIG. 2 is a schematic view of an aircraft cockpit including an interaction system according to an embodiment of the invention.

As illustrated in FIG. 1 and generally designated 10, an interaction system between an aircraft pilot and his environment according to an embodiment of the invention is intended to be integrated in an aircraft cockpit as illustrated in a highly schematic manner in FIG. 2.

The interaction system 10 comprises:
- one or more units 12 for establishing the spatial position of the eyes of the pilot, that unit or those units establishing the spatial position of the visual focus of the pilot (principal action of the pilot) in a manner repeated over time (or permanent manner),
- a detection device 14 which is configured to detect a selection and/or validation and/or confirmation action on the part of the pilot,
- one or more activation zone(s) 16 (of the cockpit), each comprising or each being associated with an element of interest EI which is connected with the cockpit or its external environment and which can be activated by interaction of the eyes of the pilot therewith; this zone is displayed, for example, on a display surface of the cockpit, such as a screen (in FIG. 1, only one activation zone has been illustrated for the sake of simplification),
- a data processing unit 18 which is capable of receiving data transmitted by the unit(s) 12 and the device 14, and of processing them. The unit 18 is particularly capable of receiving and processing initially the spatial position data which are transmitted by the unit(s) 12. In accordance with the processing of the spatial position data, the unit 18 is capable of supplying or not supplying an activation signal S of the element of interest EI of the activation zone 16. This signal is intended to activate the element of interest. The activation of the element of interest informs the pilot about the availability of further interaction with that element of interest (obtaining information, possible actions in relation to the element of interest). In this manner, the pilot knows that it is possible to interact with the element of interest if he wishes.

The element of interest EI is by definition an element which is internal with respect to the cockpit and which may correspond either to an object which is internal with respect to the cockpit or to a representation (image, etcetera) of an external object with respect to the aircraft and which may or may not be visible from the cockpit.

The data processing unit 18 is also capable of receiving data D from different devices (radar, GPS, sensors, avionics systems such as processors, etcetera), for example, in order to be able to position the elements of interest EI representing objects which are external with respect to the cockpit on a display surface of the cockpit.

A storage space 19 is used to store different data and pieces of information which are obtained in real time and/or by calculation and which may also have been obtained beforehand. The space may thus act as a database. It may be noted, on the one hand, that the activation zones are referenced in the interaction system and, on the other hand, that the coordinates of those activation zones are known to the system. Those two types of information are, for example, stored in the storage space 19.

It may be noted that the unit 12 for establishing the spatial position of the eyes of the pilot or each of those units (if there are several of them) is, for example, an "eye tracker".

The detection device is, for example, here a tactile surface which is known per se, for example, of the same type as that found in smart phones and digital tablets.

Such a tactile surface 14 detects a selection and/or validation and/or confirmation gesture carried out by a hand or the two hands of the pilot.

FIG. 2 is a highly schematic view of the interior of an aircraft cockpit C which includes an interaction system such as the system 10 of FIG. 1. The processing unit 18 is not illustrated in FIG. 2.

In the cockpit C, two seats for the pilot P1 and the co-pilot P2 are arranged in front of the windscreen 20, of which only the central portion has been illustrated in a highly schematic manner for the sake of simplification. The other pieces of equipment of the cockpit are not illustrated for the same reasons.

The cockpit C comprises a plurality of screens or display supports 16a-n which each comprise at least one element of interest EIi which is displayed on the screen in question. Each element of interest EIi is surrounded by or is part of an activation zone. Each activation zone allows activation of the element of interest which it comprises. Those activation zones are defined as being zones with which the pilot may interact with his eyes and therefore which he can activate. Those activation zones are referenced in the storage space of the interaction system.

The activation of a zone may, for example, take the form of a display of information (data, sign(s), symbol(s), geometric drawing(s), et cetera). For example, it may be a contour of the zone (circle) which is highlighted.

In an optional manner, an activation zone may have an information display which marks its activatable nature for the pilot even before the pilot has set his eyes on this zone in order to activate it. Such display or marking of this zone may take different forms (transparent circle, superimposed on the activation zone, symbol to the side or on the zone, etcetera).

If such a prior display or marking does not appear for a zone, the pilot knows that the zone cannot be activated.

When a screen comprises a single element of interest, the element of interest generally occupies practically the whole of the surface of the screen. In this example, the screens 16a-n are arranged side by side under the windscreen 20, for example, in the form of a horizontal band. Other arrangements may be envisaged. Two establishment units 12 are positioned under the activation zone opposite the seat of the pilot P1 and the seat of the co-pilot P2, respectively.

An instrument panel 22 is arranged below the activation zones 16a-n and the establishment units 12 and extends in front of the seats. The instrument panel comprises pieces of equipment (dials, screens, levers, keys, etcetera) which are not illustrated for the sake of clarity. The tactile surface 14 is arranged on the instrument panel 22 and may or may not be integrated therein.

This example involves a single tactile surface which extends over the instrument panel from a portion of the instrument panel located in front of one of the two seats as far as another portion of the instrument panel located in front of the other seat. Alternatively, a plurality of tactile surfaces may be involved, for example, two surfaces which each extend only in front of one of the two seats.

FIG. 3 illustrates, in the form of a flow chart, the main steps of an interaction method between an aircraft pilot and his environment. Those steps are carried out by the interaction system described with reference to FIGS. 1 and 2 when the pilot (or his co-pilot) is sitting in his seat in the cockpit and looks at a scene which is unfolding in real time before his eyes. This scene includes, on the one hand, the display which is produced on different display screens and devices of the cockpit, which include the screens 16a-n and, on the other hand, the windscreen as an optional display surface, and the external environment which is visible through the windscreen. Information concerning the environment which is external with respect to the aircraft and which cannot be seen through the windscreen is, for example, captured by cameras which are positioned on-board and/or transmitted to the aircraft by external systems (satellites, ground-based installations, other aircraft in flight, etcetera) and subsequently set out on one or more screens or other display devices of the cockpit.

That information includes, for example, images and/or videos which represent the external environment and images and/or videos of specific objects thereof.

There will now be described with reference to FIG. 3 and FIGS. 4a-e an example of implementation of the method of FIG. 3. In this example, the pilot P1 of FIG. 2 looks at the screens of the cockpit and particularly the screen 16i (FIG. 4a) which comprises the element of interest EIi (pieces of information visible on the screen and of interest to the pilot). The screen 16i as a whole corresponds, for example, to an activation zone.

For example, a PFD type screen (acronym for Primary Flight Display) on which the pilot will input the parameters of the flight plan in order to modify his route may be involved.

In other examples, only a fraction of the screen corresponds to an activation zone.

The interaction method begins with a first (optional) step S1 for the prior display of information which is intended to indicate to the pilot the activation zones connected with the cockpit and optionally his environment. That displayed information visually identifies the activation zones (screens, other surfaces, windscreen, etcetera). That display may be accompanied by an audible alert.

In the example described and in the remainder of the description of the method, it will be considered that the pilot does not have this information concerning the "activatable" nature of the different zones connected with the cockpit and/or his external environment.

The second step S2 of the method is a step of establishing in a manner repeated over time (or in a permanent manner) the spatial position of the visual focus of the pilot as a result of the establishment unit 12 facing him. The position of the eyes of the pilot is identified by spatial coordinates. Those spatial coordinates are supplied by the establishment unit 12 to the processing unit 18 when the visual focus of the pilot has remained fixed on a zone for a predetermined time. By way of example, that time is in the order of 200 ms.

The data processing unit 18 of FIG. 1 obtains those spatial coordinates and compares them (step S3) with the known spatial coordinates of the different activation zones of the cockpit and the spatial coordinates which are external with respect to the cockpit. When there is overlap between the coordinates from the detection step and the coordinates previously stored, the processing unit 18 identifies the zone being looked at by the pilot and therefore knows that there is interaction between the visual focus of the pilot and the zone in question.

The data processing unit 18 compares the zone being looked at identified in this manner with all the activation zones "referenced" in the storage space 19 of the interaction system.

If the zone looked at is a zone which is not referenced by the interaction system, that means that an activation zone is not involved and therefore no possibility of further interaction is possible with this zone for the pilot.

Therefore, the following step S4 is a decision step involving non-activation and the establishment of the position of the visual focus of the pilot continues (step S2 already described).

If, however, the zone looked at is a zone referenced by the interaction system, that means that an activation zone is involved. This is the case for the screen 16i.

Figures 4A, 4B, 4C:
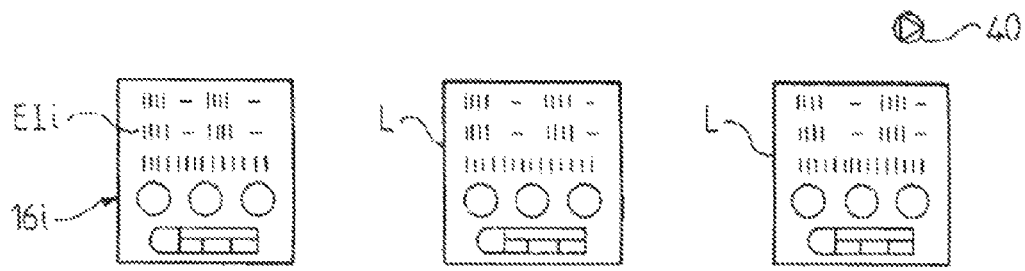
FIGS. 4a to 4e illustrate a first succession of steps of the interaction method of FIG. 3.

Since the screen 16i can be activated, the data processing unit 18 decides to activate it in the following step S5. That activation is illustrated in FIG. 4b by highlighting the zone in relation to the other non-activated activation zones. That use becomes evident, for example, by the contour L of the retained activation zone 16i becoming very bright and indicates to the pilot the availability of interaction with that zone, in particular with the element of interest thereof.

The following step S6 is a test step in order to establish whether the pilot does or does not wish to validate the activation zone/activated element of interest. The validation confirms the interest which the pilot attaches to the activation zone/element of interest at which he looked.

The pilot may decide, if he wishes, not to validate the activation of the viewed activation zone. In this case, the test step S6 is continued with the detection step S2.

If, however, the pilot decides to confirm his selection, the validation is carried out. This validation is carried out by the pilot and is considered to be a complementary action which is detected by the detection device 14. That validation is carried out, for example, by a generic "engagement" gesture which may be in the form of a hand gesture over the tactile surface 14 (gesture given among a library of predefined gestures). That "engagement" gesture is thus, for example, a pressing action carried out at one of the pressing zones of a computer mouse (for example, left click) once the activation zone has been selected on screen (therefore, a relative movement and not an absolute movement is involved). Therefore, the engagement gesture does not need to be precise and may be carried out over the entire extent of the tactile surface. The absence of precision required of the pilot in order to validate the activation also allows sustained attention on his part not to be required, nor must he expend a great deal of energy in order to accomplish this task. Therefore, the pilot may keep his concentration on the activation zone/activated element of interest or on a different task to be accomplished.

The validation is illustrated in FIG. 4c and is accompanied (step S7) by the display of visual interface elements, which are referred to as primary elements, to the side of the activation zone/activated element of interest and which in this instance are in the form of a single element 40 displayed above. The appearance of this primary visual interface element beside the activation zone/the activated element of interest shows that the element is active and that it is therefore possible to interact therewith. The primary visual interface element displayed is, for example, a symbol or a graphic interface which informs the pilot about the interaction method. In this instance, the element 40 is represented by an arrow inside a circle (the arrow and/or the circle may be colored or non-colored) which indicates the gesture to be carried out by the user in order to obtain pieces of information associated with the element of interest and/or to carry out actions in relation to this element of interest.

It may be noted that the display of a plurality of primary visual interface elements beside the activation zone/the activated element of interest may represent different options of a menu (information and/or actions). The display of one or more primary visual interface element(s) is generally carried out at a distance from the activation zone/activated element of interest which is less than or equal to the size or the dimensions of the activated element of interest. It may be noted that, if the activated element of interest has two different dimensions, the above-mentioned distance is, for example, less than or equal to the mean of the two dimensions. That allows the pilot easily to have an overview of the activation zone/activated element of interest and the primary visual interface element(s) displayed. Furthermore, the display with geometric proximity to the activated element of interest (physical link) facilitates a mental association between the primary visual interface element(s) and the element of interest.

The following step S8 is a simultaneous selection and validation step by the pilot in respect of a primary visual interface element.

This selection is considered to be a complementary action detected by the detection device 14.

This step is carried out, for example, by effecting the gesture corresponding to the symbol/graphic interface displayed. In the example illustrated in FIG. 4c, this step is carried out by a gesture of the pilot over the tactile surface 14 from left to right (in the direction indicated by the arrow 40).

This gesture brings about the display (step S9 and FIG. 4d) above the activation zone/activated element of interest of a plurality of visual interface elements 42 which are referred to as secondary elements. Those elements 42 appear as elements or different options of a contextual menu or a list (information and/or possible actions relating to the activated element of interest) arranged one above the other.

This gesture also allows the elements and the symbol system/graphic interface displayed to the side thereof or in a superimposed state to be "locked on" the activated element of interest (target). This is particularly advantageous when the activated element of interest (target) moves relative to the aircraft, which is the case when the element of interest represents an external object with respect to the aircraft. As for the primary visual interface element 40, the secondary visual interface elements 42 are displayed at a distance from the zone/activated element of interest which does not exceed the size thereof or the mean of the different dimensions thereof. It may be noted that those elements 42 are, for example, displayed on the windscreen (in the lower portion) which is used as a display surface above the screen 16i.

Figures 4D, 4E, 5A:
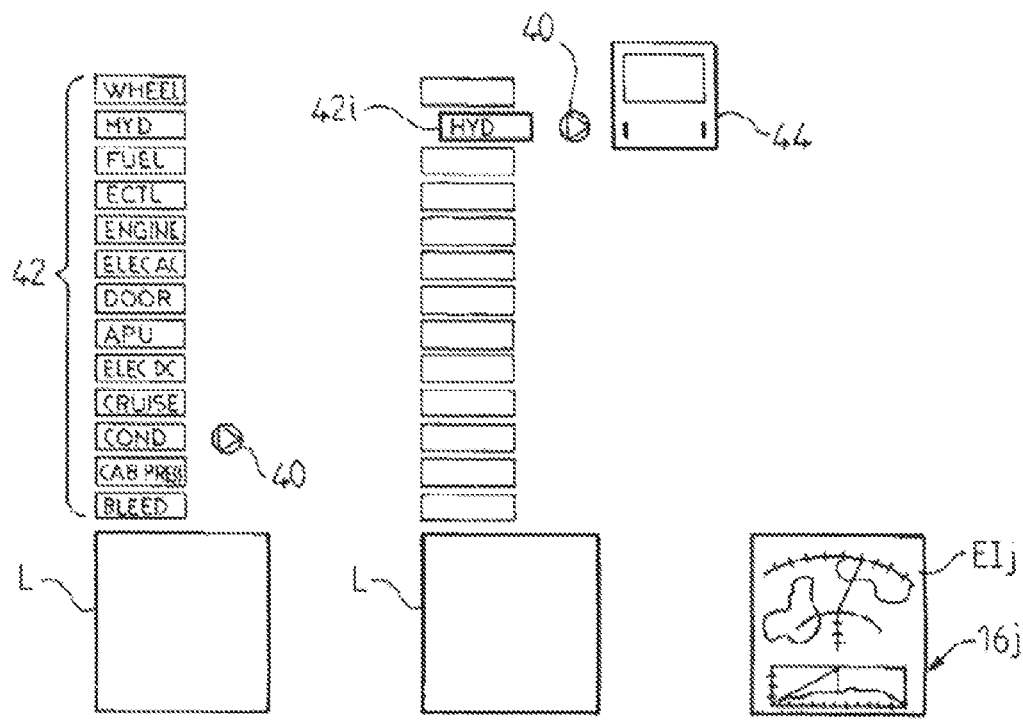
FIGS. 5a to 5g illustrate a second succession of steps of the interaction method of FIG. 3.

The following step S10 is a selection step (complementary action detected by the detection device 14) of a secondary visual interface element by the pilot from the plurality of secondary visual interface elements 42 (FIG. 4d).

In the example illustrated in FIGS. 4d and 4e, this step is carried out by a first non-precise gesture of the pilot on the tactile surface 14. A gesture carried out in a downward direction is involved in order to navigate in the menu or list of elements 42 and to point to the secondary visual interface element which interests the pilot, for example, the element 42i (FIG. 4e). This gesture is carried out without the pilot allowing his eyes to leave the activation zone/activated element of interest and the secondary visual interface elements 42 displayed close beside. The interest which the pilot attaches to the element 42i is expressed by the willingness to obtain further information concerning it and/or to carry out actions relating to this element. The validation of the element 42i is subsequently carried out by performing the gesture corresponding to the symbol 40 (step S11), that is to say, by moving the hand on the tactile surface from left to right. This validation gesture causes a display zone 44 to appear beside the element 42i and the symbol 40. That display zone 44 may also be a parameter editing zone. That validation is considered to be a complementary action which is detected by the detection device 14.

In the example described, the validation step continues with the detection step S2 already described.

FIGS. 5a to 5f illustrate the implementation of other aspects of the interaction method of FIG. 3 when the pilot looks at another screen, such as the screen 16j (FIG. 5a).

Figures 5B, 5C, 5D:
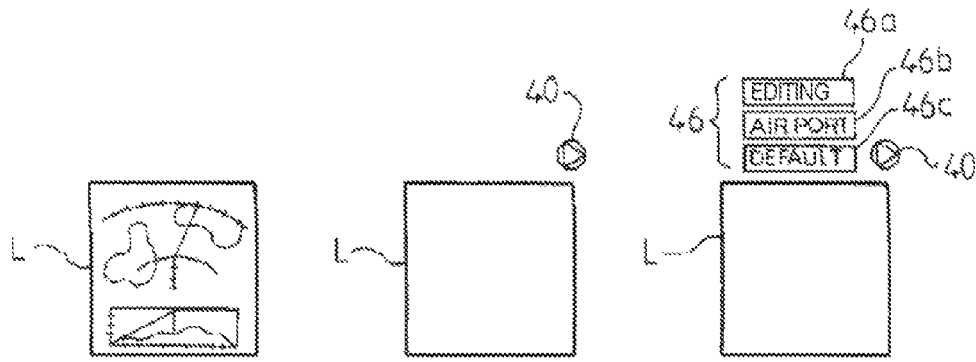

The establishment (step S2) of the position of the visual focus of the pilot on the activation zone 16j/element of interest EIj allows activation of this activation zone and the element of interest. This activation is carried out as in FIG. 4b (step S5) by highlighting the contour L (FIG. 5b). The validation step S6 and the display step S7 of a primary visual interface element 40 are identical to those described above with reference to FIGS. 4b and 4c and lead to the display illustrated in FIG. 5c above the activation zone/activated element of interest.

The selection of the element 40 (step S8) which is carried out in a manner identical to the selection carried out in FIG. 4c, leads to the display of the plurality 46 of secondary visual interface elements 46a, 46b, 46c. That display (step S9) is in the form of a menu or a list (information associated with the element of interest and/or actions to be carried out in relation to that element of interest) above the activation zone/activated element of interest (FIG. 5d).

Figures 5E, 5F:
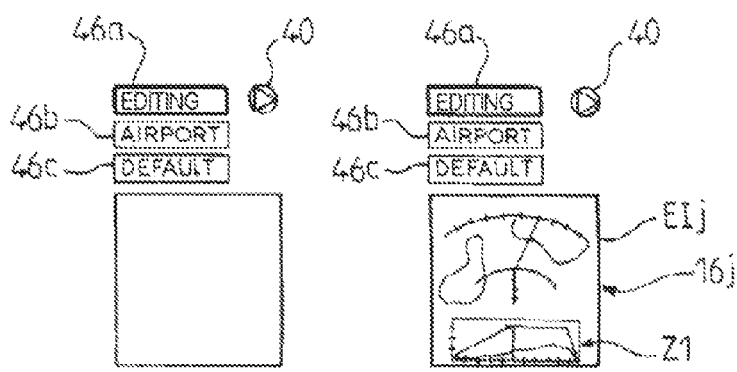

As explained above, the navigation in the list of secondary visual interface elements 46a-c in order to select (step S10) an element from that list is carried out by the pilot by moving his hand substantially vertically over the tactile surface 14. In this example, he thus points to the secondary visual interface element 46a which corresponds to an "editing" action for the activated element of interest (FIG. 5e).

The validation (step S11) of the element 46a is subsequently carried out by making the gesture corresponding to the symbol 40, that is to say, by moving a hand over the tactile surface from left to right. This validation gesture brings about the activation or the highlighting of a zone Z1 (for example, by brightly highlighting) on the activated element of interest EIj. During this validation step (activation of the zone Z1), the pilot keeps looking at the zone Z1. The activation of this zone indicates to the pilot that he is authorized to carry out an "editing" function on this portion of the activated element of interest (FIG. 5f). Carrying out the editing function (editing action) allows one or more parameters of the portion of the activated element of interest to be modified.

Figure 5G:
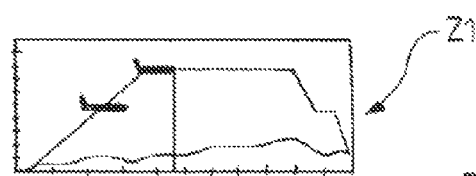

The activation of this zone Z1 can also be seen in the activation of the X and Y scales of the graph of the zone Z1 enlarged in FIG. 5g and a cursor on each scale. The zone Z1 represents the "Vertical Display" VD, that is to say, the graph of the altitude of the aircraft at each location of the flight in accordance with the distance along the route provided for the aircraft. Generally, the vertical display VD is displayed on the above-mentioned PFD display.

The following step S12 is a parameter modification step (editing function) which allows, for example, modification of the altitude at one of the locations of the flight plan or the display scale, for example, by modifying the pitch of the unit from 10 to 50 in order to carry out a "zoom" function on the graph.

The modification is carried out, for example, by means of a relative horizontal or vertical gesture of the hand of the pilot over the tactile surface 14 in order to move the cursor on each axis and to expand or contract the representation. During this step, the pilot is not obliged to keep looking at the zone Z1.

The following step S13 is a step of validation by the pilot of the modification carried out in the preceding step.

This validation is carried out, for example, by the pilot carrying out a specific gesture on the tactile surface.

This step is carried out under the control of the visual focus of the pilot, that is to say that the validation is possible only when the pilot is looking at the zone Z1. This condition is controlled by the data processing unit 18 which permanently compares the coordinates of the position of the visual focus with those of the element of interest being modified.

The validation operation is suspended when the visual focus of the pilot leaves the element of interest and the modified zone thereof and is returned to the location at which it was stopped when the visual focus of the pilot returns to the zone.

It may be noted that, when the pilot looks at an activation zone/a non-activated element of interest, the editing gestures are deactivated until the activation zone/element of interest is activated.

The step S13 is followed by the step S2 already described.

FIGS. 6a to 6f illustrate a succession of steps of the interaction method of FIG. 3 which are carried out when the pilot is interested in an object which is part of the external environment of the cockpit and which is, for example, visible through the windscreen. The element of interest EI which represents this object is an image of the object visible through the windscreen.

In this example, the surface of the windscreen 20 is used as a display surface of the activation zone and the different primary and secondary visual interface elements, information and associated symbol systems, etcetera.

Figure 6A:
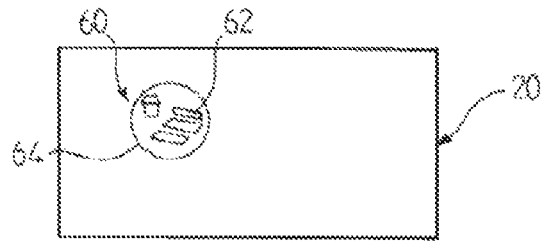
FIGS. 6a to 6f illustrate a third succession of steps of the interaction method of FIG. 3.

FIG. 6a illustrates an activation zone 60 which comprises an element of interest 62. This element of interest is a representation of the real object which is part of the external environment with respect to the aircraft and which is visible through the windscreen 20 of the cockpit. In this example, an airport is involved.

More specifically, the activation zone 60 corresponds to a zone of the windscreen superimposed on the external object located in the background. In the plane of FIG. 6a, the activation zone 60 surrounds the element of interest 62 which appears as an image of the real object on the surface of the windscreen.

In this example, all the elements of interest are identified in a visible manner for the pilot in order to inform the pilot about their activatable nature. To this end, for example, this may involve displaying pieces of information which represent the activatable nature of a zone. This display may, for example, be in the form of a transparent circle superimposed on each activation zone.

In FIG. 6a, a transparent circle 64 is displayed on the activation zone 60 of the windscreen so as to indicate this zone to the pilot.

When the pilot is looking at the scene of FIG. 6a, the interaction method of FIG. 3 provides, as already described, for the establishment (S2), comparison (S3) and activation (S5) steps of the activation zone 60 viewed by the pilot.

The data processing unit decides to activate the zone 60, for example, by highlighting the contour of the circle 64' (FIG. 6b), thereby indicating to the pilot that it is possible to interact with the zone and the associated element of interest.

Figure 6B:
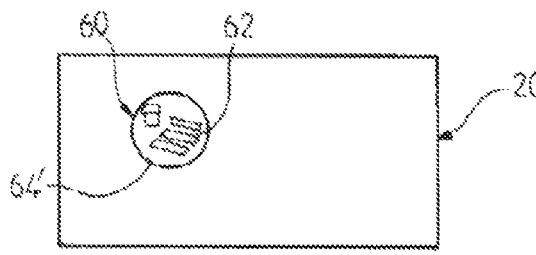
Figure 6C:
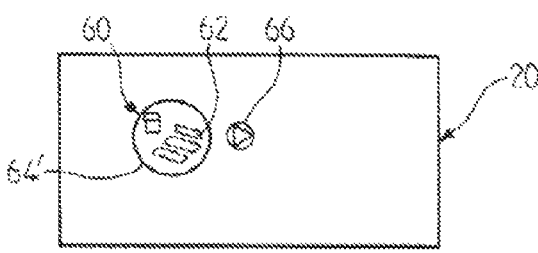

The validation step (S6) and the display step (S7) of a primary visual interface element 66 which is identical to the element 40 already described lead to the display illustrated in FIG. 6c. The primary visual interface element 66 is displayed beside the circle 64' (at a distance less than or equal to the diameter of the circle) on the windscreen. Its symbol informs the pilot about the gesture to be performed in order to further interact with the activation zone/activated element of interest, all as for the above-mentioned element 40.

Figure 6D:
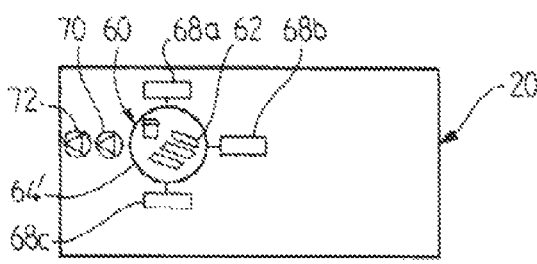

A gesture of the pilot on the tactile surface 14 (step S8) from left to right causes a plurality of secondary visual interface elements 68a-c to appear in a manner superimposed on the activation zone/activated element of interest (FIG. 6d and step S9). This involves, for example, icons representing information which depends on the activated element of interest and/or actions to be performed in relation to the element of interest. These icons are distributed around the circle 64' in order to make them more visible to the pilot. Their arrangement also allows their selection by means of a corresponding gesture of the hand on the tactile surface to be made easier: a gesture (without any precision) downwards allows the icon 68c to be selected.

It may be noted that the distribution of the icons around the circle and therefore the sufficiently great space between the icons (in relation to the space left between the icons 42 of the FIG. 4d) alternatively allows them to be selected by establishing the position of the eyes of the pilot on one or other of the icons.

Furthermore, two identical symbols 70, 72 which represent the inverted symbol 66 appear to the left of the circle 64'.

The presence of those two symbols side by side indicates to the pilot that it is simply necessary for him to carry out twice on the tactile surface 14 the gesture corresponding to the symbols in order to return to the situation of FIG. 6b (activation zone/activated element of interest). It may be noted that, in order to carry out such an action, the pilot must keep his hand on the tactile surface. This prevents inadvertent gestures on the tactile surface.

Figure 6E:
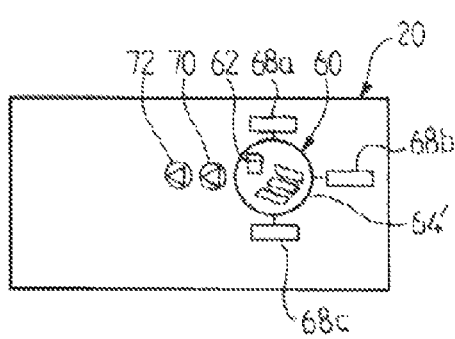

When the display of FIG. 6d appears, the circle 64' and all the secondary visual interface elements 68a-c and the symbols 70-72 displayed are locked to the activation zone/activated element of interest. In this manner, when the aircraft moves in relation to this activation zone/this activated element of interest, the circle 64' and all the visual interface elements and symbols displayed follow the activation zone/activated element of interest, as illustrated in FIG. 6e.

Figure 6F:
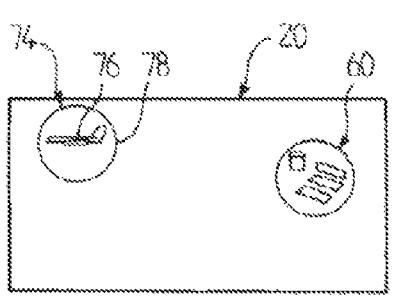

FIG. 6f shows on the screen of the windscreen another activation zone 74 with another element of interest 76 representing an aircraft in this instance. The zone is identified as being able to be activated as a result of the presence of the circle 78 indicating the activation zone/element of interest.

It may be noted that, generally, the circle or another symbol which identifies, in a definite manner for the pilot, an activatable zone which is associated with an element of interest can be positioned on the activation zone/element of interest or a portion thereof, or beside it, in accordance with needs and circumstances. In accordance with the visibility desired, it may be desirable not to hide anything in respect of the external object and therefore the element of interest and thus to display the circle or another symbol beside the element of interest.

In the example illustrated in FIG. 6f, the pilot has followed the symbol system illustrated by the symbols 70, 72 (left arrows) by making the same gesture three times in succession on the tactile surface 14 in order to return to the situation of FIG. 6a and thus to be able to change activation zone/element of interest.

The detection of the position of the visual focus of the pilot on the new activation zone 74 allows activation thereof and, for example, execution of the steps S3 and the following steps of the method of FIG. 3 already described.

It may be noted that the elements of interest involved in the example of the FIGS. 6a-f are images visible through the windscreen 20 of external objects which are part of a scene which appears before the eyes of the pilot through the windscreen.

However, the pilot may also be interested in external objects which are not visible to the pilot either because they are hidden by an obstacle positioned in front of the windscreen (for example, a mountain or meteorological conditions which reduce visibility) or because they are arranged in a different direction (for example, above, below or behind the aircraft).

In any case, information concerning those external objects which cannot be seen from the cockpit may be obtained by equipment/devices which are placed on-board and/or which are remote (satellites, ground installations, in-flight aircraft, et cetera). That information may thus be displayed on a screen or another display surface with the element of interest representing each object.

The windscreen of FIGS. 6a to 6f may, for example, be replaced by a screen of the cockpit, on which there are displayed images or a video sequence of an external object which cannot be seen through the windscreen. The images or the video sequence are obtained, for example, by one or more external cameras. The sequence of steps illustrated in FIGS. 6a to 6f may be applied, for example, to an external object which cannot be seen through the windscreen. Such an external object may be, for example, an aircraft in flight which the pilot wishes to see.

The activation zones which comprise an element of interest connected with the cockpit or its external environment and which have been described above with reference to FIGS. 1 to 6f may be of different forms and in particular:

one of the screens of the cockpit,
a portion of a screen of the cockpit,
at least one portion of the windscreen of the cockpit,
a transparent screen interposed in front of the windscreen of the cockpit inside the cockpit.

Other activation zones which are not mentioned above may also be envisaged.

It may be noted that the element of interest connected with the cockpit or its external environment is at least one of the following elements of interest:

one of the screens of the cockpit,
a portion of a screen of the cockpit,
an editable scale on a screen of the cockpit,
a representation of another aircraft,
a representation of an airport or an external object which is or is not visible through the windscreen of the cockpit.

However, other elements of interest which are not mentioned above may also be envisaged.

During the description of the first example with reference to FIGS. 1, 2 and 4a to 4e, the activation of an activation zone is initiated on the basis of the establishment of the position of the eyes of the pilot on the zone involved for a predetermined minimum time.

The other steps of the method which require a complementary action on the part of the pilot (for example, validation (S6), selection (S8 and S10), validation (S11), modification (S12) and validation (S13)) and the detection of this action have been described as having been carried out by a gesture of the hand of the pilot on the tactile surface 14 of the system. This combination of physical interactions (eye and hand) between the pilot and the cockpit thus allows the activation, simply by looking, of an activation zone/element of interest (object, etcetera) and subsequently access to information and/or one or more functions by means of a complementary action such as one or more specific gestures which require little precision. This combination is very effective because it allows the accomplishment of tasks by the pilot to be made easier, using a lower level of attention in order to carry out specific tasks which require little precision in the course of the gestures. In this manner, the pilot may devote more sustained attention to other tasks which require more concentration and/or more precision in the course of the gestures.

This activation process thereby reduces the burden on the pilot in terms of attention, which becomes evident as an increase in time for carrying out other tasks. The fact of not requiring precision and therefore sustained attention in order to carry out the activation task (S5) and its validation (S6) is advantageous in an environment subjected to vibrations such as an aircraft cockpit.

This is because the vibrations which are produced in a cockpit normally require of the pilot sustained attention in order to perform a conventional gesture (pressing on a button, etcetera).

The execution by the pilot of complementary actions (S8, S10, S11, S12, S13, et cetera) requires relatively little precision in the course of the gestures, or none at all, which is again found to be advantageous in a vibrating environment.

However, the steps intended above which relate to a complementary action or at least some of them may be carried out differently.

By way of example, the execution of one or more of those steps by the pilot may particularly be in one of the following forms:

a gesture in space (as a result of sensors positioned on the hands or one of the hands of the pilot as already described in brief; the gesture is a predefined gesture among a set or a library of predefined gestures), pressure on a key of a keyboard or on a pedal, the activation ("click") of a mouse, a device such as a Keyboard Cursor Control Unit (KCCU) or a pointing device, the emission of one or more predefined sounds from a set or a library of predefined sounds (for example, voice of a member of the team), the displacement of a potentiometer, a predetermined time during which the visual focus of the pilot is fixed on the activation zone involved, on the element of interest or a more specific zone thereof, such as the zone Z1 of FIG. 5f, the time for which a hand of the pilot remains on the activation zone involved, on the element of interest or a more specific zone thereof, such as the zone Z1 of FIG. 5f.

The execution of those steps by the pilot brings about the same advantages as those set out above (a gesture requiring little precision, generally relative and not absolute movement, increase in time, et cetera).

The execution of one or more of those steps by the pilot may, for example, be suggested by the display of information or suitable symbols on or beside the activated element of interest. A plurality of interaction possibilities may particularly be proposed to the pilot.

It is possible to envisage other methods of interaction with the activation zone involved, the element of interest or a more specific zone thereof in order to carry out such steps.

It may be noted that two units for establishing the position of the visual focus of the pilot 12 have been illustrated in FIG. 2. In a variant which is not illustrated, however, a single unit 12 may be used opposite the seat of the pilot P1.

Similarly, the tactile surface 14 may be reduced in terms of its extent in order to be used only by the pilot P1.

In the examples described above, the activation of an activation zone is in the form of highlighting of the contour of the zone (contour of a screen, circle surrounding an element of interest, et cetera).

However, any other symbol system for highlighting the activation zone may be envisaged, as may the emission of a sound signal which may or may not be coupled with the visual activation of the zone.

It may also be noted that the element of interest of an activation zone may, under some circumstances, particularly concerning visibility, be positioned beside the drawing, symbol, contour, etcetera, indicating this zone.

After activation of an activation zone/element of interest, the pilot has access to information and/or one or more possible functions/actions which are associated with the activated element of interest. Those possible functions/actions may involve, for example, obtaining information, communicating, selecting (highlighting), following a trajectory, avoiding an obstacle or a meteorological event (such as a violent storm, etcetera), defining a landing location, including in a flight plan a transition location such as entry and departure locations of the ETOPS segments.

According to a variant, the step S7 of FIG. 3 may give rise to the display of a plurality of primary visual interface elements. The step for selecting a primary visual interface element from the plurality of elements and the validation step are carried out in a distinct and consecutive manner and are no longer simultaneous.

Figure 7:
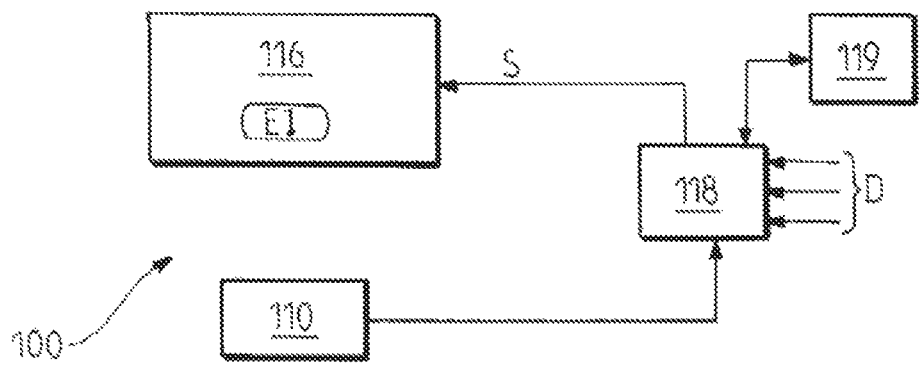
FIG. 7 is a schematic view of a pilot/environment interaction system according to another embodiment of the invention.

According to another embodiment illustrated in FIG. 7, an interaction system 100 between an aircraft pilot and his environment comprises:
- at least one unit 110 for establishing in a manner repeated over time the spatial position of a hand or the hands of the pilot,
- an activation zone 116 (of the cockpit) comprising an element of interest EI connected with the cockpit or its external environment and which can be activated by interaction of a hand of the pilot therewith (this zone is displayed, for example, on a display surface of the cockpit such as a screen or the windscreen of the cockpit),
- a data processing unit 118 which is capable of receiving spatial position data which are transmitted by the unit(s) 110 for establishing the spatial position of a hand or the hands of the pilot, processing them and, in accordance with the processing, supplying or not supplying an activation signal S of the element of interest EI of the activation zone. This signal is intended to activate the element of interest which allows the pilot to be informed about the availability of further interaction with that element of interest.

The system 100 is intended to be integrated in an aircraft cockpit such as the one in FIG. 2. In the present embodiment, the screens 16a-n of FIG. 2 comprise elements of interest EI1-n each surrounded by an activation zone 116. These screens are tactile surfaces in this instance.

It may be noted that the unit(s) for establishing the spatial position of a hand or the hands of the pilot may comprise sensors which are positioned on the hand(s) of the pilot. For example, gloves allowing the gestures of the hand to be acquired may be involved (using, for example, an exoskeleton structure or conductive ink or optical fibers).

As in the embodiment of FIG. 2, a storage space 119 identical to the space 19 is provided to store the different activation zones (referenced zones) of the cockpit and their coordinates.

In the same manner, data D from different devices of the aircraft are transmitted to the unit 118 in order to be able to position elements of interest representing objects which are external with respect to the cockpit on a display surface connected with the cockpit.

The interaction system may operate by means of interaction of the hand of the pilot with the activation zone in order to activate it.

FIGS. 8a-d illustrate an embodiment of a physical interaction between a hand M of the pilot and a screen 120 of the cockpit which comprises an activation zone 122.

Figure 8A:
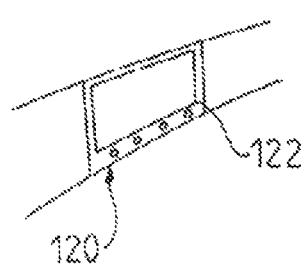
FIGS. 8a-d are successive schematic views illustrating an interaction between the hand of a pilot and a screen of a cockpit.

As illustrated in FIG. 8a, no display is visible on the screen when the pilot does not interact therewith with his hand.

Figure 8B:
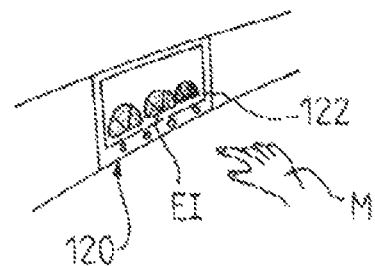

In FIG. 8b, the pilot moves his hand M towards the screen. The position of this hand, which position is established by the unit 110, is transmitted to the processing unit 118 which compares it to the known position of the activation zone 122.

In the example described, the established position of the hand is at a distance from the activation zone 122 less than or equal to a predefined threshold distance. For this distance or below this distance, the activation of the activation zone 122 is automatically initiated by the transmission of an activation signal S to this zone. The activation has the effect of illuminating the activation zone (FIG. 8b) and thereby causing the display of an activated element of interest EI to appear.

Figure 8C:
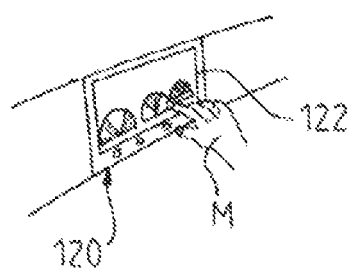

The validation of this activated element of interest is carried out in a very simple manner by a gesture of the pilot who touches the element of interest EI with his hand (FIG. 8c).

Figure 8D:
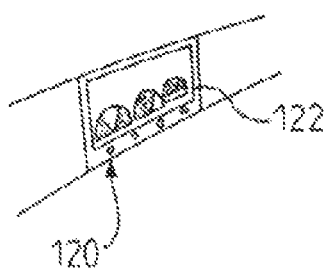

As illustrated in FIGS. 8c and 8d, the pressure of the hand M on the element of interest modifies the lighting of a portion of this element of interest, thereby confirming the validation operation.

Subsequently, the pilot moves his hand away from the screen.

By way of example, the threshold distance between the screen 120 and the hand M corresponds to the size of the element of interest of the activation zone and, for example, to its largest dimension.

The other steps of the method of FIG. 3 which are described above (complementary actions) and which relate (after activation of the activation zone/element of interest) to the access by the pilot to information and/or one or more possible functions/actions which are associated with the activated element of interest also apply in this embodiment. The method of interacting with the element of interest in order to access that information and/or those functions/actions may be carried out as indicated above for the embodiment of the preceding Figures. In particular, the complementary actions may be carried out by means of a tactile surface such as the surface 14. Alternatively, the other methods set out above as alternatives to the first embodiment may be used.

Alternatively, the position of the hands of the pilot may be established by a camera, in particular for establishing the proximity of the hand to the activation zone and the activation thereof.

According to another construction variant which is not illustrated, the interaction system 100 also comprises a unit for establishing the spatial position of the eyes of the pilot, which unit is identical to the unit 12 of FIG. 1.

Such a unit is used to establish one or more complementary actions of the pilot after activation and validation of the validation zone 122, as explained above with reference to FIGS. 8a-d.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An interaction method in an aircraft cockpit between a pilot and his environment, wherein the cockpit comprises at least one activation zone which comprises an element of interest which is connected with the cockpit or the external environment thereof and which can be activated on the basis of the interaction of at least one movable member of the body of the pilot with the at least one activation zone, the method comprising the following steps:

establishing, in a manner repeated over time, a spatial position of at least one movable member of the body of the pilot, comparing the established spatial position and a spatial position of the at least one activation zone in order to establish whether there is interaction between the at least one movable member of the pilot and the at least one activation zone, in accordance with the result of the comparison, making a decision involving activation or non-activation of the element of interest of the at least one activation zone in order to inform the pilot about the availability of further interaction with the element of interest, and displaying one or more visual interface elements affording at least one of access to information and possible actions relating to the activated element of interest.

2. The method according to claim 1, further comprising accepting a validation by the pilot of the activated element of interest.

3. The method according to claim 2, wherein the above-mentioned displaying step is a first displaying step of one or more visual interface elements, referred to as primary elements, the method further comprising a second displaying step for a plurality of visual interface elements, referred to as secondary elements, which afford at least one of access to information and possible actions relating to the activated element of interest.

4. The method according to claim 2, further comprising a step of accepting a selection of one of the visual interface elements by the pilot.

5. The method according to claim 2, wherein the display of a visual interface element is carried out at a maximum distance from the activated element of interest which corresponds to the size of the activated element of interest.

6. The method according to claim 2, further comprising a step of comparing the activated element of interest with a plurality of reference elements of interest, for each of element of interest at least one of which pieces of information are available and actions are possible.

7. The method according to claim 2, wherein acceptance of the selection of at least one visual interface element by the pilot affords access to the modification of at least one information element relating to the activated element of interest.

8. The method according to claim 7, further comprising a step of accepting modification of the at least one information element by the pilot.

9. The method according to claim 7, further comprising a step of accepting validation of the effected modification of the at least one information element by the pilot.

10. The method according to claim 9, wherein accepting of the validation of the modification is possible as long as the at least one movable member of the body of the pilot interacts with the activated element of interest.

11. The method according to claim 1, wherein before the interaction of the at least one movable member of the body of the pilot with the at least one activation zone, the method comprises a step of displaying information indicating to the pilot the element of interest connected with the cockpit or his environment with which further interaction is possible.

12. The method according to claim 11, wherein the pieces of information are displayed at a maximum distance from each activated element of interest which corresponds to the size of the activated element of interest.

13. An interaction system in an aircraft cockpit between a pilot and the pilot's environment, wherein the interaction system comprises:

one or more units for establishing the spatial position of at least one movable member of the body of the pilot, at least one activation zone which comprises an element of interest connected with the cockpit or its external environment and which can be activated on the basis of the interaction of the at least one movable member of the body of the pilot with the at least one activation zone, a data processing unit configured to compare the spatial position established and the spatial position of the at least one activation zone of the cockpit in order to establish whether there is any interaction between the at least one movable member of the pilot and the at least one activation zone, the data processing unit also being configured to decide to activate or not to activate the element of interest of the at least one activation zone in order to inform the pilot about the availability of further interaction with the element of interest, and a display unit configured to display one or more visual interface elements which afford at least one of access to information and possible actions relating to the activated element of interest.

14. The system according to claim 13, wherein the establishment unit comprises at least one of one or more eye trackers and one or more establishment units which are intended to establish the position of a hand of a pilot.

15. The system according to claim 13, further comprising a detection device configured to detect one of a selection, a validation and a confirmation action on the part of the pilot.

16. The system according to claim 13, further comprising at least one display surface, on which the at least one activation zone which comprises an element of interest connected with the cockpit or its environment is displayed.

17. An aircraft cockpit, comprising an interaction system between a pilot and his environment, the interaction system comprising:

one or more units for establishing the spatial position of at least one movable member of the body of the pilot, at least one activation zone which comprises an element of interest connected with the cockpit or its external environment and which can be activated on the basis of the interaction of the at least one movable member of the body of the pilot with the at least one activation zone, a data processing unit configured to compare the spatial position established and the spatial position of the at least one activation zone of the cockpit in order to establish whether there is any interaction between the at least one movable member of the pilot and the at least one activation zone, the data processing unit also being configured to decide to activate or not to activate the element of interest of the at least one activation zone in order to inform the pilot about the availability of further interaction with the element of interest, and a display unit configured to display one or more visual interface elements which afford at least one of access to information and possible actions relating to the activated element of interest.

* * * * *